United States Patent
Luong et al.

(10) Patent No.: US 8,072,907 B2
(45) Date of Patent: Dec. 6, 2011

(54) METHOD AND SYSTEM TO RESTART IS-IS WHEN LSP WRAPS

(75) Inventors: Steven V. Luong, San Jose, CA (US); Rena Whei-Ming Yang, Sunnyvale, CA (US); Heidi Ou, Saratoga, CA (US)

(73) Assignee: Cisco Technolgy, Inc., San Jose, CA (US)

( * ) Notice: Subject to any disclaimer, the term of this patent is extended or adjusted under 35 U.S.C. 154(b) by 805 days.

(21) Appl. No.: 11/116,474

(22) Filed: Apr. 28, 2005

(65) Prior Publication Data
US 2006/0245429 A1 Nov. 2, 2006

(51) Int. Cl.
*H04L 12/28* (2006.01)
*H04L 12/56* (2006.01)
*H04J 3/24* (2006.01)
(52) U.S. Cl. ............... 370/255; 370/394; 370/474
(58) Field of Classification Search ............... 370/254
See application file for complete search history.

(56) References Cited

U.S. PATENT DOCUMENTS

| 5,086,428 | A | * | 2/1992 | Perlman et al. | 370/394 |
| 6,012,099 | A | * | 1/2000 | Chung | 709/249 |
| 6,389,016 | B1 | * | 5/2002 | Sabaa et al. | 370/389 |
| 6,493,342 | B1 | * | 12/2002 | Breslow et al. | 370/394 |
| 2002/0001294 | A1 | * | 1/2002 | Amouris | 370/337 |
| 2002/0150043 | A1 | * | 10/2002 | Perlman et al. | 370/225 |
| 2003/0223385 | A1 | * | 12/2003 | Jiang | 370/324 |
| 2005/0038901 | A1 | | 2/2005 | Barker | |

* cited by examiner

*Primary Examiner* — Andrew Chriss
(74) *Attorney, Agent, or Firm* — Fish & Richardson P.C.

(57) ABSTRACT

A method, system, apparatus and machine-readable medium for transmitting a packet through a network to convey network topology is provided. The method includes the step of generating at least one link state protocol data unit (LSP) with a first identifier until reaching a maximum sequence number in a sequence assigned to a network device, represented by the first identifier. The method further includes the step of modifying the first identifier to produce a second identifier. The method also includes the step of generating at least one LSP with the second identifier, and with a sequence number that is less than or equal to the maximum sequence number in the sequence. The system for transmitting a packet through a network, to convey network topology, comprises the means for performing the above-mentioned method steps.

17 Claims, 4 Drawing Sheets

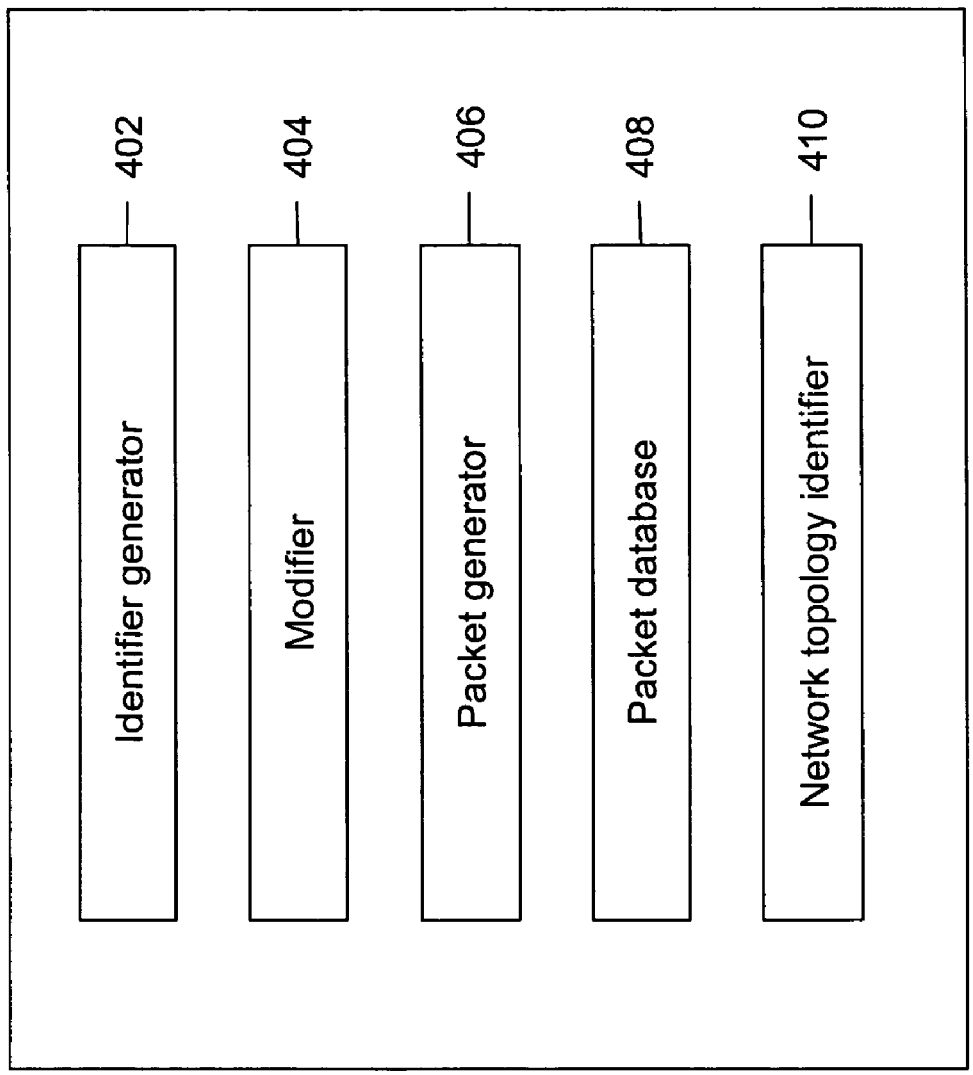

METHOD AND SYSTEM TO RESTART IS-IS WHEN LSP WRAPS

BACKGROUND OF THE INVENTION

1. Field of Invention

Embodiments of the invention relate in general to packet transfer in networks. More specifically, the embodiments of the invention relate to methods and systems for conveying network topology by transmitting packets through a network.

2. Description of the Background Art

In order to transfer data in a network, knowledge of topology of the network is required. The network topology provides information pertaining to the communication links between nodes in the network. In case of intermediate system to intermediate system (IS-IS) intra-domain routing protocol, the nodes maintain consistency in the network topology by flooding link state protocol data unit packets (LSPs) in the network. Each node receives and stores LSPs received from other nodes in an LSP database (LSPDB), and uses LSPDB to ascertain the network topology. The node conveys a change in the network topology by transmitting LSP with a higher sequence number compared to the previous LSP until maximum sequence number is reached. After reaching the maximum sequence number, the node wraps up and starts generating LSPs with initial sequence number in the assigned sequence.

International Organization for Standardization (ISO) recommendation 10589 specifies that whenever the LSP sequence wraps for IS-IS, that particular IS-IS node should be disabled and wait for a period at least MaxAge+ZeroAgeLifetime (20 minutes by default, but 18 hours in some cases) before it is restarted. This is to ensure that every node in the network has timed out the previous LSP with the maximum sequence number. Otherwise, the new LSP sequence, after wrapping, becomes 1, and may appear older when it is compared to the maximum sequence LSP. The neighbors that receive the LSP with sequence number 1 can subsequently flood the LSP with the maximum sequence number back to the source node. As a result, the source node will regenerate its LSP using sequence number 1. This cycle is repeated because the source node may never be able to generate an LSP that appears newer than the maximum sequence LSP until it has timed out in every node in the network.

However, disabling a node for up to 18 hours, or even 20 minutes, is not acceptable if there is no alternative node for forwarding data. Fortunately, in a normal operation, it would take 136 years before an IS-IS node reaches its maximum LSP sequence number, even if the node regenerates the LSP once every second. However, because bugs in the software, and hackers, may artificially inject bad LSPs in the network, the LSP sequence number may reach the maximum number prematurely.

BRIEF DESCRIPTION OF THE DRAWINGS

FIG. 4 illustrates a block diagram of a system for conveying network topology by transmitting packets in a network, in accordance with an exemplary embodiment of the present invention.

DETAILED DESCRIPTION OF EMBODIMENTS OF THE INVENTION

The various embodiments of the present invention provide a method, system, apparatus and computer-readable medium for transmitting a packet through a network. The various embodiments of the invention describe an algorithm to restart an Intermediate System-Intermediate System (IS-IS) node, when a LSP sequence wraps instead of disabling the IS-IS node.

Figure 1:
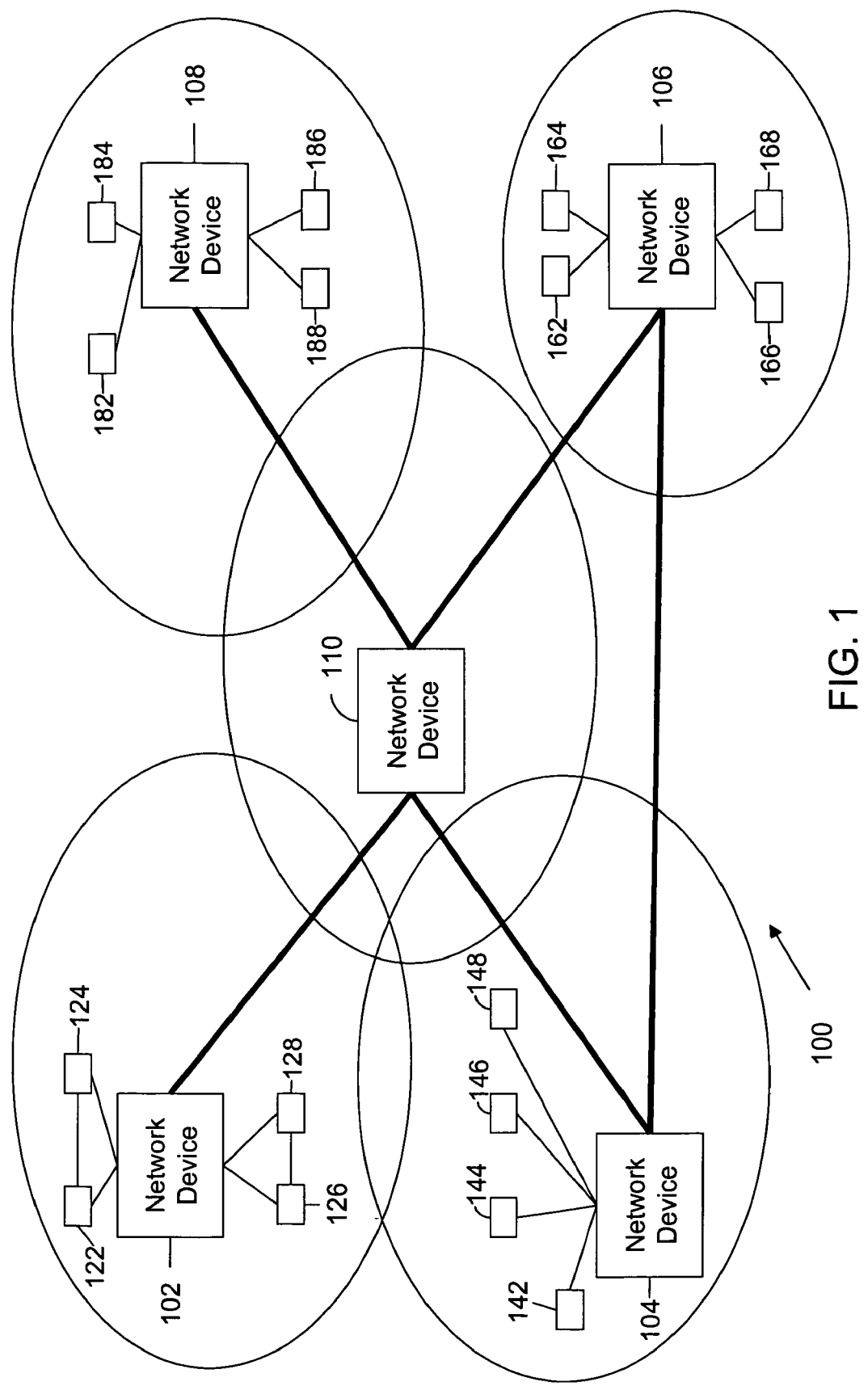
FIG. 1 illustrates a network, in accordance with an exemplary embodiment of the present invention.

FIG. 1 illustrates a network 100, in accordance with an exemplary embodiment of the present invention. Network 100 includes a plurality of network devices such as network devices 102, 104, 106, 108 and 110. Each network device is connected with a plurality of computing devices. For example, network device 102 is connected with computing devices 122, 124, 126 and 128. Network device 104 is connected with computing devices 142, 144, 146 and 148. Further, network device 106 is connected with computing devices 162, 164, 166 and 168; additionally, network device 108 is connected with computing devices 182, 184, 186 and 188. The elliptical shapes surrounding the network devices represent virtual sub-networks. In various embodiments of the invention, network 100 can be a local area network (LAN), a wide area network (WAN), or the Internet. In various embodiments of the present invention, network devices 102, 104, 106, 108 and 110 can be routers, data switches, or the like.

In an exemplary embodiment of the present invention, when a user wants to send a data packet from computing device 122 to another user on computing device 168, the data packet transfer takes place as explained below.

The data packet is transferred from computing device 122 to network device 102. From network device 102, the data packet is transferred to network device 106. From network device 106, the data packet is then transferred to computing device 168. Each data packet includes an identification header, which includes information regarding recipient computing device, data packet generating computing device, and other information such as the priority of the data packet, and the like.

For example, when the data packet is sent from computing device 122 to computing device 168, it includes information regarding data packet generating computing device 122 and the recipient computing device, in this case, computing device 168. Based on the information included in the identification header of the data packet, it is transferred to the recipient computing device in network 100. For example, when a data packet is generated by computing device 122, to be transferred to computing device 124, the data packet is transferred directly to computing device 124. Alternatively, when computing device 122 generates a data packet that is to be transferred to computing device 126, the data packet is first transferred to network device 102, which then transfers the data packet to computing device 126. Transfer of the data packets is based on the knowledge of the network topology of network 100.

The network topology needs to be consistent amongst the network devices of network 100. The transfer of data in network 100 takes place using a routing protocol, which describes the network topology. In an embodiment of the present invention, the routing protocol is intermediate system to intermediate system (IS-IS) intra-domain routing protocol. In the case of IS-IS, the network devices maintain the consistency in the network topology by flooding packets in the network. The packets include information regarding location of the source network device, and communication links of the source network device with other network devices. In an embodiment of the present invention, the packet is a link state protocol data unit (PDU) packet (LSP).

In an embodiment of the present invention, network devices 102, 104, 106, 108, and 110, represent a first layer of network topology. Further, computing devices 122, 124, 126, and 128 connected to network device 102, represent a second layer of network topology. When data is to be transferred within the virtual sub-network, for example, transfer of data from computing device 142 to computing device 146, the second layer of network topology takes part in the data transfer. On the other hand, when data transfer involving computing device 122 and computing device 164 is to be carried out, then the first layer of the network topology, along with the second layer of network topology takes part in the data transfer.

Figure 2:
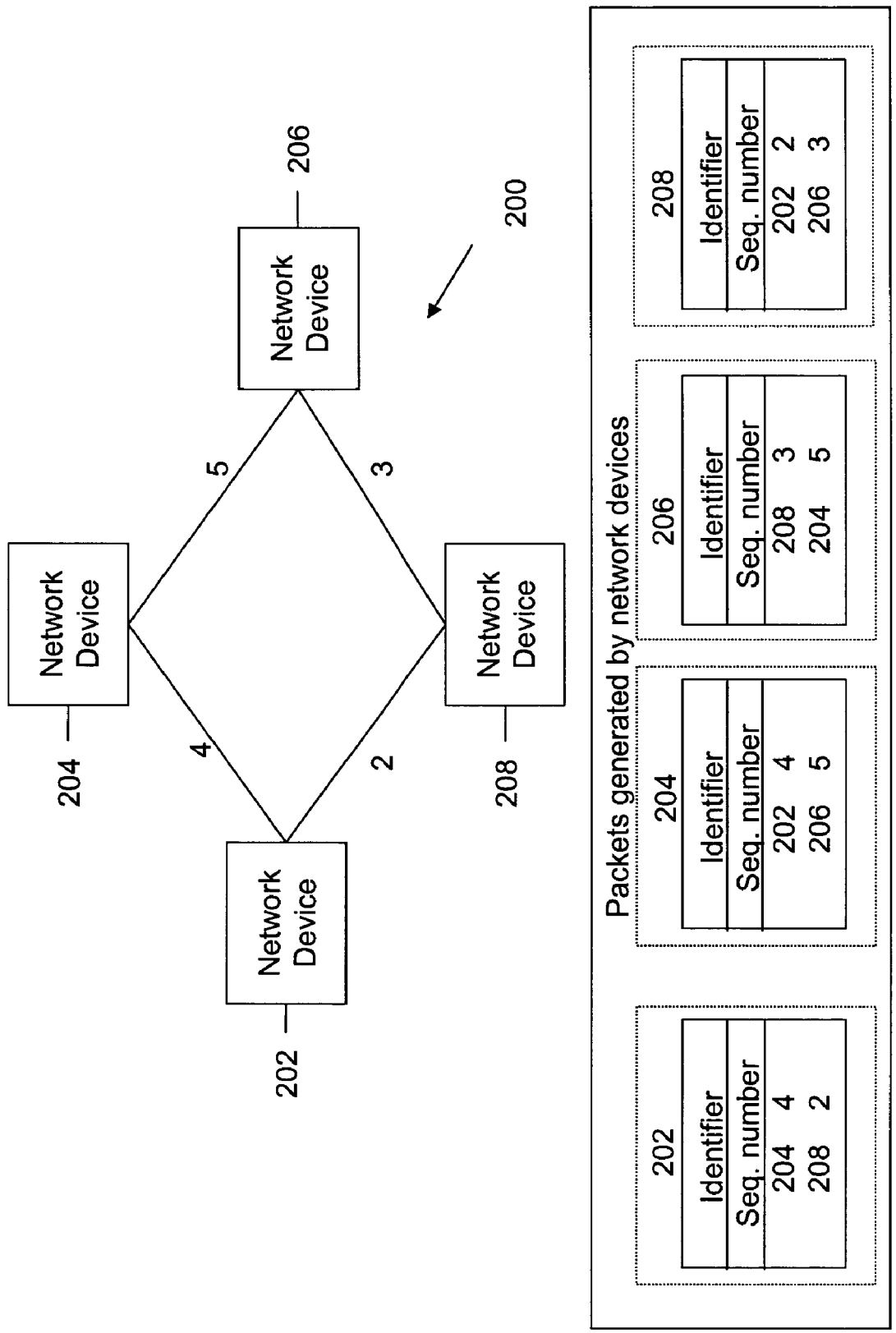
FIG. 2 illustrates packets generated by network devices in a network, in accordance with an exemplary embodiment of the present invention.

FIG. 2 illustrates packets generated by network devices in a network 200, in accordance with an exemplary embodiment of the present invention. Network 200 includes network devices 202, 204, 206 and 208. In an embodiment of the present invention, network devices 202, 204, 206, and 208 convey information by generating packets that include information pertaining to their location and communication links with other network devices. In an embodiment of the present invention, the packet is an LSP. FIG. 2 illustrates LSPs generated by network devices 202, 204, 206 and 208. For example, the LSP generated by network device 202 includes information such as an identifier, a sequence number and information related to communication links of network device 202 with other network devices in network 200, in this case, network devices 204 and 208. Each communication link has a delay time to transfer data, in other words each communication link displays a cost to transfer the data. For example, time taken to transfer a data packet from network device 202 to network device 204 is 4 units. Whereas, time taken to transfer data from network device 202 to network device 208 is 2 units.

LSPs generated by network devices, for example network device 202, are flooded throughout network 200. Initially, LSP is transferred to neighboring network devices, in this case, network devices 204 and 208. Network devices 204 and 208 then accept the LSP and store it in their LSP database (LSPDB). Subsequently, the neighboring network devices further transfer the LSP to other network devices in network 200, in this case, network device 206. In the similar fashion, each network device 204, 206 and 208 also generate LSPs comprising information pertaining to their location and communication links with other network devices.

Each network device, for example, network device 202, receives LSPs generated by other network devices, in this case, the LSPs generated by network devices 204, 206 and 208. The network topology of network 200 is conveyed to each of the network device in network 200 via LSPs, and the consistency in the information is maintained. In an embodiment of the present invention, network device 202 further stores the LSPs received from other network devices. Additionally, network device 202 ascertains the network topology of network 200 using these LSPs. Further, each network device, such as 204, 206 and 208 in network 200, decides the network topology. Since, each network device in network 200 receives the similar LSPs, the network topology is consistent throughout all of network devices 202, 204, 206 and 208. A method of conveying the network topology by transmitting LSPs through a network is explained in conjunction with FIG. 3.

Figure 3:
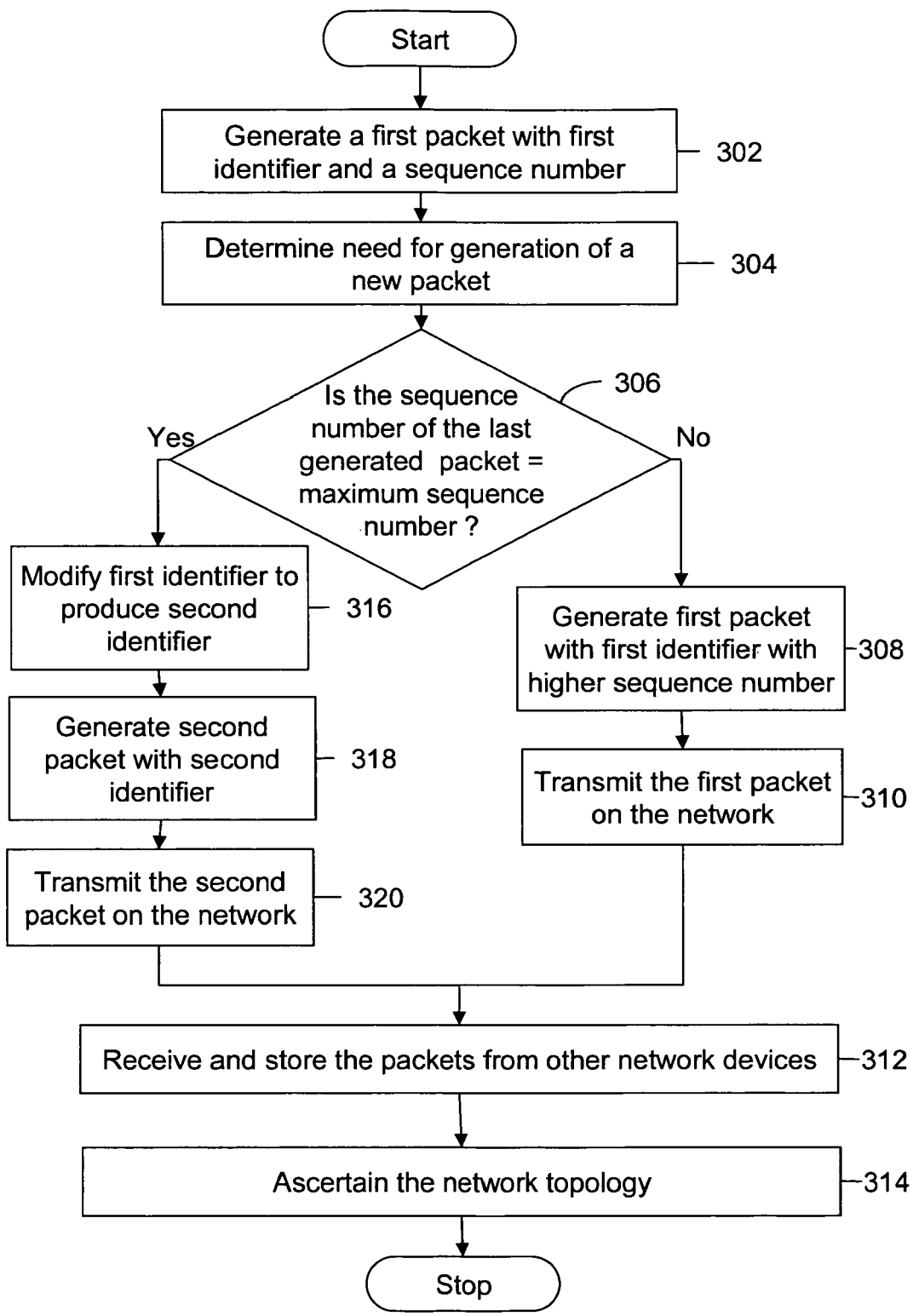
FIG. 3 is a flow chart depicting a method for conveying network topology by transmitting a packet through a network, in accordance with an embodiment of the present invention.

FIG. 3 is a flow chart depicting a method for conveying the network topology by transmitting a packet through a network, in accordance with an embodiment of the present invention. In order to convey the location details and communication links with other network devices, a network device of a network generates an LSP at step 302. In this manner, the network device, for example, network device 202, generates an LSP. Each LSP includes a unique identifier, assigned to the LSP generating network device, and a sequence number in a sequence assigned to the LSP.

At step 304, the network device, for example, network device 202, determines if there is a need to generate a new LSP. The new LSP is generated by network device 202 when there is a change in the network topology, i.e., an additional network device is added to network 200. Additionally, any substantial change in network 200 is conveyed by network device 202 to other network devices 204, 206 and 208 of network 200 by sending a new LSP. Further, each of the LSPs has a lifetime and once the LSP reaches maximum age, the LSP dies out, that is to say, network devices in network 200 remove the LSP. Hence, network device 202 may also generate a new LSP prior to expiration of the previously generated LSP.

The new LSP includes information regarding the sequence of the generated packets. The new LSP has a sequence number that is higher than the sequence number of the previously generated LSP. The higher sequence number is an indication that the LSP is newer. The higher the sequence number of the LSP, the newer is the LSP and vice-versa. For example, sequence numbers of two consecutive LSPs generated by a network device are as follows, XXX XXX XXX XXX 001, XXX XXX XXX XXX 002.

At step 306, the network device, for example, network device 202, checks if the sequence number of the previously generated LSP is the maximum possible sequence number. As described in conjunction with step 304, the assigned sequence number increases whenever a new LSP is generated. However, the sequence assigned to network device 202 has a maximum limit, represented by a number known as the maximum sequence number of the assigned sequence. Further, when network device 202 generates the new LSP and sends the new LSP on the network, other network devices receive the new LSP and compare it with the previously stored LSP. In case the network device determines that the new LSP has a sequence number higher than the sequence number of the LSP stored by the network device, the network device accepts and stores the new LSP and removes the previously stored LSPs.

At step 306, the network device, for example, network device 202, checks if the sequence number of the previously generated LSP is the maximum sequence number. If the sequence number of the previously generated LSP is not the maximum sequence number, then at step 308, network device 202 generates a new LSP with the first identifier and a sequence number higher than the sequence number of the previously generated LSP.

At step 310, the newly generated LSP is transmitted on network 200. Network devices 204 and 208, i.e., the neighboring network devices receive the LSP and check if the received LSP is new compared with the LSP they have stored in their database. If the received LSP is newer compared to the stored LSP, then the neighboring network devices 204 and 208 accept the new LSP. At step 312, network devices 204 and 208 accept and store the new LSP in their database; subsequently, network device 202 accepts and stores the LSPs from other network devices in network 200. Additionally, network devices 204 and 208 purge the previously stored LSPs. Further, network devices 204 and 208 flood the newly received LSP on network 200. Network devices 204 and 208 mark the newly received LSP for flooding and send it across network 200. The remaining network devices in network 200, in this case network device 206, subsequently receive the LSP. Each of the network devices of network 200 accepts and stores the LSP in database. At step 314, each of the network devices of network 200 ascertains the network topology using the LSPs stored in their LSP databases (LSPDB).

If the sequence number of the previously generated LSP is the maximum sequence number, then at step 316, network device 202 modifies the first identifier to generate a second identifier. In an embodiment of the present invention, the second identifier can be generated by modifying the first identifier. In another embodiment of the present invention, a system identification (ID) number can be used to generate the second identifier. In a further embodiment of the present invention, the second identifier can be generated using a machine address corresponding to at least one of the interfaces of network device 202.

At step 318, network device 202 generates a LSP with the second identifier. Further, network device 202 purges all the previously generated LSPs with the first identifier. At step 320, the newly generated LSP is transmitted through network 200. Subsequently, network devices 204, 206, and 208 receive the LSP with the second identifier and remove the LSPs with the first identifier. The newly received LSPs are used to ascertain the network topology. In various embodiments of the invention, method steps 312 and step 314 follow the step of transmitting LSPs through network 200, i.e., step 320.

In another embodiment of the present invention, the second identifier is checked for uniqueness within network 200. If the second identifier generated by network device 202 is not unique, and is already being used by one of the other network devices of network 200, the network operator notifies network device 202 to change the second identifier or generate another identifier. Additionally, the network device may generate an error message, for example, 'attemptToExceedMaximumSequenceNumber'.

In an embodiment of the present invention, when network device 202 generates the second identifier, network device 202 stores the auto generated second identifier. During restarting and reconnecting to network 200, if network device 202 finds out that the auto-generated second identifier is already in use in network 200, network device 202 purges all the LSPs that are being generated with the duplicate second identifier. The removal of LSPs with the second identifiers is followed by a repetition of the method steps from step 302 to 320 to generate another identifier that is not in use throughout the network. A system for performing the above-mentioned method steps for generating LSPs and ascertaining the network topology is explained in conjunction with FIG. 4.

In an embodiment of the present invention, the step of ascertaining the network topology is followed by executing an algorithm to determine the shortest possible path between two network devices in network 200. The algorithm used to determine the shortest possible path between two network devices makes use of the cost units mentioned in the LSPs generated by the network devices of network 200. In an embodiment of the invention, the algorithm used to determine the shortest path is the Dijkstra's shortest path first (SPF) algorithm. Further, each of the network devices, for example, network device 202 of network 200, determines the network topology in accordance with shortest path tree (SPT) with the network device as root. Each of the network devices has a different SPT, as the SPT is calculated with the calculating network device as the root of the SPT. Further, based on the SPT, each of the network devices generates a routing information base (RIB). RIB is used for transmitting data packets in network 200.

FIG. 4 illustrates a block diagram of a system 400 for conveying network topology by transmitting packets in a network, in accordance with an exemplary embodiment of the present invention. System 400 includes an identifier generator 402, a modifier 404, a packet generator 406, a packet database 408, and a network topology identifier 410. Identifier generator 402 generates the first identifier. Modifier 404 generates the second identifier by modifying the first identifier. Alternatively, modifier 404 generates the second identifier by using, for example, the machine address of one of the interfaces of the network device. Packet generator 406 generates LSP comprising first identifier, sequence number in the sequence assigned to the LSP, cost of the data transfer on the communication links the network device has with other network devices in the network, until reaching the maximum sequence number in the sequence. Packet generator 406 generates LSP comprising second identifier with a sequence number that is less than or equal to the maximum sequence number in the sequence, after reaching the maximum sequence number in the sequence represented by the first identifier. Packet database 408 stores the LSP. In an embodiment of the present invention, packet database 408 is an LSP database (LSPDB). Packet database 408 receives the LSPs generated by other network devices in the network. Further, packet database 408 compares the received LSP with the previously stored LSP, and if the received LSP is new, removes the stored LSP and stores the received LSP. In an embodiment of the present invention, the second identifier is checked for uniqueness within the network. If the second identifier is not unique, another identifier is generated, until a unique identifier is found.

Network topology identifier 410 uses LSPs stored in packet database 408 to ascertain the network topology. Further, network topology identifier 410 executes an algorithm to determine the shortest possible path between two network devices in a network. Then, network topology identifier 410 calculates the SPT for the network device, and based on the SPT, the RIB is computed. The RIB is used for the transmission of data in the network, for example network 200.

In various embodiments of the invention, each of the system elements of system 400 is implemented in the form of software, hardware, firmware and their combination thereof.

The various embodiments of the present invention have an advantage that the introduction of second identifier to represent the newly generated LSP helps in avoiding the waiting time of the network device, which is generating the new LSP, in order to point out the change in the network. Waiting time is the time for which the network device waits until the previously generated LSP, with the maximum sequence number, dies out. Hence, the downtime of the network device is reduced, and the network device remains operational for a greater amount of time.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transmitting a packet through a network, the method comprising:

determining a first identifier associated with a network device in a network, the first identifier being used to uniquely identify a plurality of first packets that are generated by the network device;

generating, by the network device, the plurality of first packets, each of the plurality of first packets including the first identifier and a different sequence number in a sequence of numbers, wherein the sequence numbers in the sequence are incremented until reaching a maximum sequence number in the sequence, wherein information in the plurality of first packets relates to a network topology of the network;

determining that a packet in the plurality of first packets generated by the network device has a sequence number equal to a maximum sequence number; and based upon the determination that the sequence number of the packet has reached the maximum sequence number:

modifying the first identifier to generate a second identifier, the second identifier being used to identify a plurality of second packets that are generated by the network device;

generating, using the network device, at least one second packet in the plurality of second packets, the at least one second packet including the second identifier and a sequence number in the sequence of numbers that is less than or equal to the maximum sequence number in the sequence, wherein the at least one second packet includes information that relates to the network topology;

determining whether the second identifier is unique in the network; and based on determining the second identifier to be non-unique in the network, purging the plurality of second packets identified by the second identifier, and performing the modifying of the first identifier to generate a second identifier, generating at least one second packet including the second identifier, and determining uniqueness of the second identifier, until the second identifier is determined to be unique in the network.

2. The method of claim 1, further comprising purging the plurality of first packets including the first identifier by the network device before generating the at least one second packet including the second identifier and the sequence number that is less than or equal to the maximum sequence number in the sequence.

3. The method of claim 1, wherein the second identifier comprises a system identification (ID) number.

4. The method of claim 1, further comprising generating the second identifier using a machine address associated with an interface of the network device.

5. The method of claim 1, further comprising:
detecting a restart of the network device;
detecting a reconnection of the network device to the network; and
determining the uniqueness of the second identifier in response to the network device restarting and reconnecting to the network.

6. The method of claim 1, wherein the plurality of first packets and the at least one second packet further comprise information regarding a location of the network device in the network.

7. The method of claim 1, further comprising receiving a third packet generated by a second network device, the third packet including a third identifier and a sequence number in the sequence.

8. The method of claim 7, further comprising purging the third packet including the third identifier.

9. The method of claim 7, further comprising storing the third packet by the network device.

10. The method of claim 9, further comprising using information from the stored third packet to ascertain the network topology.

11. The method of claim 7, further comprising sending the third packet by the network device to a third network device other than the second network device that generated the third packet.

12. The method of claim 1, wherein a packet in the plurality of first packets or the at least one second packet further comprises information related to the sequence associated with the packet.

13. The method of claim 1, wherein the different sequence numbers included in each of the plurality of first packets or the at least one second packet are associated with link state protocol (LSP) packet data unit (PDU) sequence number.

14. A system for transmitting a packet through a network, the system comprising:

one or more processors;

one or more instructions encoded in non-transitory machine-readable media for execution by the one or more processors, the one or more instructions when executed by the one or more processors cause the one or more processors to perform operations including:

determining a first identifier associated with a network device in a network, the first identifier being used to uniquely identify a plurality of first packets that are generated by the network device;

generating the plurality of first packets, each of the plurality of first packets including the first identifier and a different sequence number in a sequence of numbers, wherein the sequence numbers in the sequence are incremented until reaching a maximum sequence number in the sequence of numbers, wherein information in the plurality of first packets relate to a network topology of the network;

determining that a packet in the plurality of first packets generated by the network device has a sequence number equal to a maximum sequence number;

based upon the determination that the sequence number of the packet in the plurality of first packets generated by the network device has reached the maximum sequence number, modifying the first identifier to generate a second identifier, the second identifier being used to identify a plurality of second packets that are generated by the network device;

generating at least one second packet in the plurality of second packets, the at least one second packet including the second identifier and a sequence number in the sequence of numbers that is less than or equal to the maximum sequence number in the sequence of numbers, wherein the at least one second packet includes information that relate to the network topology;

determining whether the second identifier is unique in the network; and based on determining the second identifier to be non-unique in the network, purging the plurality of second packets identified by the second identifier, and performing the modifying of the first identifier to generate a second identifier, generating at least one second packet including the second identifier, and determining uniqueness of the second identifier, until the second identifier is determined to be unique in the network.

15. The system of claim 14, further comprising one or more instructions that when executed by the one or more processors cause the one or more processors to generate the second identifier using a machine address associated with an interface of the network device.

16. An apparatus for transmitting a packet through a network, the apparatus comprising;
   a computer processor; and
   a non-transitory computer-readable storage medium including instructions executable by the processor, the instructions when executed by the processor cause the processor to perform operations including:
      determining a first identifier associated with a network device in a network, the first identifier being used to uniquely identify a plurality of first packets that are generated by the network device;
      generating the plurality of first packets, each of the plurality of first packets including the first identifier and a different sequence number in a sequence of numbers, wherein the sequence numbers in the sequence are incremented until reaching a maximum sequence number in the sequence of numbers, wherein information in the plurality of first packets relate to a network topology of the network;
      determining that a packet in the plurality of first packets generated by the network device has a sequence number equal to a maximum sequence number;
      modifying the first identifier to generate a second identifier based upon the sequence number of a packet in the plurality of first packets generated by the network device reaching the maximum sequence number, the second identifier being used to identify a plurality of second packets number that are generated by the network device;
      generating, using the computer processor, at least one second packet in the plurality of second packets, the at least one second packet including the second identifier and a sequence number in the sequence of numbers that is less than or equal to the maximum sequence number in the sequence of numbers, wherein the at least one second packet includes information that relate to the network topology;
      determining whether the second identifier is unique in the network; and
      based on determining the second identifier to be non-unique in the network, purging the plurality of second packets identified by the second identifier, and performing the modifying of the first identifier to generate a second identifier, generating at least one second packet including the second identifier, and determining uniqueness of the second identifier, until the second identifier is determined to be unique in the network.

17. A non-transitory computer-readable storage medium including one or more instructions executable by a computer processor for transmitting a packet through a network, the one or more instructions when executed by the computer processor cause the computer processor to perform operations including:
   determining a first identifier associated with a network device in a network, the first identifier being used to uniquely identify a plurality of first packets that are generated by the network device;
   generating, by the network device, the plurality of first packets, each of the plurality of first packets including the first identifier and a different sequence number in a sequence of numbers, wherein the sequence numbers in the sequence are incremented until reaching a maximum sequence number in the sequence of numbers, wherein information in the plurality of first packets is related to a network topology of the network;
   determining that a packet in the plurality of first packets generated by the network device has a sequence number equal to a maximum sequence number;
   based upon the determination that the sequence number of the packet has reached the maximum sequence number, modifying the first identifier to generate a second identifier, the second identifier being used to identify a plurality of second packets that are generated by the network device;
   generating at least one second packet in the plurality of second packets, the at least one second packet including the second identifier and a sequence number in the sequence of numbers that is less than or equal to the maximum sequence number in the sequence of numbers, wherein the at least one second packet includes information related to the network topology;
   determining whether the second identifier is unique in the network; and
   based on determining the second identifier to be non-unique in the network, purging the plurality of second packets identified by the second identifier, and performing the modifying of the first identifier to generate a second identifier, generating at least one second packet including the second identifier and determining uniqueness of the second identifier, until the second identifier is determined to be unique in the network.

* * * * *